United States Patent

Thompson

[15] 3,637,344
[45] Jan. 25, 1971

[54] METHOD OF TREATING EXHAUST GASES OF INTERNAL COMBUSTION ENGINES

[72] Inventor: Charles E. Thompson, Warren, N.J.
[73] Assignee: Esso Research and Engineering Company
[22] Filed: Oct. 23, 1968
[21] Appl. No.: 770,080

[52] U.S. Cl. .................... 23/2 E, 252/460, 252/466 R, 252/472
[51] Int. Cl. .................................................. B01d 53/34
[58] Field of Search ...................................... 23/2, 2.1, 22

[56] References Cited

UNITED STATES PATENTS

| | | | |
|---|---|---|---|
| 1,222,660 | 4/1917 | Paal | 252/460 X |
| 2,781,323 | 2/1957 | Hunter | 252/460 X |
| 3,216,954 | 11/1965 | Howk et al. | 23/2 X |
| 3,259,589 | 7/1966 | Michalko | 23/2 X |
| 3,370,914 | 2/1968 | Gross et al. | 23/2 |

*Primary Examiner*—Earl C. Thomas
*Attorney*—Pearlman and Stahl and Frank T. Johmann

[57] ABSTRACT

Exhaust gases of internal combustion engines are contacted with a ruthenium-iridium catalyst to provide less objectional products suitable for discharge to the atmosphere. The ruthenium-iridium catalyst has been found to be extremely effective in promoting the removal of nitrogen oxides, carbon monoxide and unburned hydrocarbons from automobile exhaust gases. The catalyst is more effective than catalysts containing either the ruthenium component or the iridium component alone.

9 Claims, No Drawings

3,637,344

METHOD OF TREATING EXHAUST GASES OF INTERNAL COMBUSTION ENGINES

BACKGROUND OF THE INVENTION

1. Field of the Invention

This invention relates to a catalyst and method utilizing same for reducing and in some instances substantially eliminating harmful components of gases, particularly exhaust gases from internal combustion engines. In particular, the invention relates to a catalyst composition comprising ruthenium and iridium or oxides thereof. In another aspect, the invention relates to a method for purifying exhaust gases from internal combustion engines by catalytically converting unburned hydrocarbons, carbon monoxide and nitrogen oxides present therein by contacting the exhaust gases with a ruthenium-iridium catalyst without the addition of external air to the exhaust stream to reduce the nitrogen oxides contained therein and/or contacting the exhaust gases with said catalyst in the presence of external air added to the exhaust stream to catalytically oxidize the carbon monoxide and unburned hydrocarbons contained therein.

2. Description of the Prior Art

Waste products from various sources are discharged into the atmosphere and unless the waste products are treated to remove deleterious components, the waste products may contaminate the atmosphere. A specific example is the case of exhaust products from automotive engines. Such waste products contain one or more harmful components such as unburned hydrocarbons, carbon monoxide, nitrogen oxides, sulfur compounds, partially oxidized products, etc., in various concentrations.

Among the above constituents of exhaust gas, carbon monoxide, unburned hydrocarbons, and nitrogen oxides (e.g., NO) are considered as undesirable from an air pollution standpoint. Carbon monoxide (CO) is harmful for its toxic properties, NO is also physiologically harmful. Hydrocarbons and NO are additionally harmful, even though present in very small amounts, because they participate in a sequence of photochemical reactions which eventuate in the formation of eye-irritating, crop-damaging, visibility-reducing smog. These problems become acute in urban areas where local meteorological conditions prevent the normal upward convective movement of ground level air for long time periods. The recent and foreseeable future increases in automotive population density in urban areas, with the attendant increase in exhaust emissions, make essential the discovery of effective solutions to these problems through reduction in the amounts of CO, hydrocarbons, and NO discharged from an automotive exhaust.

The usual, and widely studied and evaluated, approaches to these problems are based upon the fact that most engine operation is under rich-mixture conditions, i.e., there is usually too little oxygen present for the conversion of all hydrocarbons to $CO_2$ and $H_2O$. Thus, one approach adjusts the carburetor toward leaner operation and also makes certain other adjustments of the engine. This approach can reduce CO and hydrocarbons, but probably will increase NO and can result in engine performance that is inferior to that obtained with a richer mixture.

Another approach adds a controlled amount of additional air outside the engine combustion chamber, i.e., in the exhaust stream, and then seeks to oxidize CO and hydrocarbons, either catalytically or thermally (the latter either with or without a true flame) by action of the oxygen in the added air, again, NO can be increased by this approach.

SUMMARY OF THE INVENTION

In accordance with this invention, it has been found that catalysts comprised of ruthenium and iridium and/or oxides thereof are very effective, in the absence of substantial amounts of oxygen, catalysts for promoting the reduction of nitrogen oxides normally present in exhaust gases, particularly exhaust gases from internal combustion engines. Further in the presence of significant amounts of oxygen the catalyst of this invention is also extremely effective in promoting the catalytic oxidation of hydrocarbons and carbon monoxides. As is shown hereinafter, the catalyst of this invention possesses catalytic nitrogen oxide reduction activity and hydrocarbon and carbon monoxide oxidation activities greater than those of conventional catalysts heretofor employed for these purposes. Further, the catalyst of this invention is more effective than catalysts containing either the ruthenium component or the iridium component alone.

The catalyst of this invention comprises any catalyst containing ruthenium and iridium and/or oxides thereof as the active components. Ruthenium catalysts for the conversion of exhaust gas impurities are described in a copending U.S. application Ser. No. 721,622, but the catalyst described therein is not effective as catalysts containing both the ruthenium and iridium components. Thus, the catalyst of the invention must contain both ruthenium and iridium (metals or oxides). The relative amounts of ruthenium and iridium present in the catalyst may range from a ruthenium/iridium weight ratio of from about 10/1 to about 1/10. Preferably, the ruthenium/iridium weight ratio will be within the range between about 4/1 and 1/1.

Although the catalyst of the invention may consist entirely of ruthenium and iridium and/or oxides thereof, it is preferable for economic reasons to impregnate the ruthenium and iridium on supports. The catalyst supporting techniques and methods of preparation are well known in the art, and it is not intended to limit the catalyst to any particular form or method of preparation. Also, the ruthenium and iridium (metals or oxides) may be combined with metals such as nickel, or may contain various catalyst promoters such as KOH, $K_2CO_3$, Rb, or Ba. In a preferred embodiment, the catalyst of the invention contains 0.5 to 0.005, preferably 0.1 to 0.02, weight percent ruthenium and 0.05 to 0.001, preferably 0.02 to 0.005, weight percent iridium on a support wherein the percents given are based on the total weight of the catalyst which includes the support material. Suitable supports include alumina, silica, zirconia, diatomaceous earth, or any other well-known catalyst support.

For the reduction of nitrogen oxides, the exhaust gases of internal combustion engines are preferably contacted with the ruthenium-iridium catalysts at temperatures in excess of 500° C. in the presence of small amounts of free oxygen. Preferably, the gas treated to reduce the nitrogen oxide content thereof will contain less than about 2.0 percent free oxygen on a volume basis. In this connection, most engine operation is normally under rich-mixture condition because rich-mixture operation is essential for smooth performance of the engine at idle and light load, is essential for high power output at full load, and is also frequently necessary for the suppression of knock in the combustion process. Thus, the exhaust gases coming from the combustion chamber of an internal combustion engine will normally contain only very small amounts of free oxygen, which amounts of oxygen will normally be less than about 1 percent on a volume basis, e.g., 0.8 percent volume $O_2$, and certainly less than about 2.0 volume percent $O_2$. In accordance with one embodiment of the invention, therefore, the exhaust gases of an internal combustion engine are contacted without adding external oxygen or air to the exhaust stream with the ruthenium-iridium catalyst of the invention to reduce the nitrogen oxide content thereof.

If there is no addition of air or oxygen outside of the engine combustion chamber, i.e., in the exhaust stream, the reduction of the nitrogen oxide in the exhaust gas will be promoted by the ruthenium-iridium catalyst with little oxidation of the carbon monoxide or unburned hydrocarbons contained therein. In this instance, therefore, it may be desirable to thereafter burn the treated exhaust gases having a substantial amount of the nitrogen oxides removed therefrom, in the presence of a controlled amount of additional air by the use of a conventional afterburner device.

In another embodiment of the invention, the treated exhaust gases having a substantial proportion of the nitrogen oxides removed therefrom will be contacted with the ruthenium-iridium catalyst at temperatures in excess of 500° F. in the presence of oxygen or air which is added to the exhaust gas stream in an amount sufficient to catalytically oxidize the carbon monoxide and unburned hydrocarbons contained therein. In general, the presence of an amount of oxygen within the range between about 2 and 10 volume percent or higher will be sufficient to effect a substantial oxidation of the unburned hydrocarbons and carbon monoxide contained in the exhaust gases.

The exhaust gases treated in accordance with the invention may be passed over the ruthenium-iridium catalyst over varying conditions, e.g., space velocities of 100 to 200,000 (STP) volume per volume of catalyst per hour, under pressures from about near atmospheric to 10 p.s.i.g., and at temperatures in excess of about 500° F.

If predominantly nitrogen oxides are to be eliminated, then the temperatures can be within the range between about 500° F. and 1,600° F. or higher, i.e., the maximum temperature is limited only by the physical stability of the catalyst exposed to extremely high temperatures. Preferably the catalyst temperature will be within the range between about 700° and 1,300° F., more preferably 1,000° to 1,200° F.

If predominantly unburned hydrocarbons and carbon monoxides are to be eliminated, then the temperatures can be within the range between about 500° and 2,000° F. or higher, preferably 700° to 1,600° F.

DESCRIPTION OF THE PREFERRED EMBODIMENTS

EXAMPLE 1

A typical catalyst of the invention was prepared in the following manner:

A solution of 0.056 gram of iridium trichloride and 0.077 gram of ruthenium trichloride in 250 ml. of distilled water was added to 300 grams of alumina having a surface area of 250 square meters per gram. The saturated alumina was dried at about 250° F. for about 4 hours and thereafter treated with hydrogen (flow rate of about 600 V/V/hr.) for 3 hours at about 1,000° F. The resulting product had a composition of about 0.01 weight percent ruthenium and 0.01 weight percent iridium on an alumina support.

In the above manner, the aforedescribed alumina was impregnated with either ruthenium or iridium to produce a catalyst containing 0.02 weight percent ruthenium on 99.98 weight percent alumina support and a catalyst containing 0.02 weight percent iridium on 99.98 weight percent alumina support.

EXAMPLE 2

The activity of each catalyst prepared in Example 1 was evaluated by passing an exhaust gas containing on a volume basis 1.5 percent CO, 0.5 percent $H_2$, 12 percent $CO_2$, 12 percent $H_2O$, 275 parts per million (p.p.m.) (propane), 1,500 p.p.m. NO, $O_2$ in an amount set forth below and balance $N_2$ over the catalyst contained in a stainless steel tube passing through a furnace. The gas feed rate was 100,000 V/V/hr. and the catalyst was maintained at a temperature of about 1,100° F. The nitrogen oxide conversions obtained after operation for about 6 hours are given below.

EVALUATION OF RUTHENIUM-IRIDIUM CATALYST

| Catalyst Composition, wt. % | Vol. % oxygen in gas feed | % Conversion of nitrogen oxide |
|---|---|---|
| 0.01 Ru-0.01 Ir-99.98 $Al_2O_3$ | 0 | 92 |
|  | 0.5 | 100 |
|  | 0.8 | 100 |
| 0.02 Ru-99.98 $Al_2O_3$ | 0 | 95 |
|  | 0.5 | 100 |
|  | 0.8 | 56 |
| 0.02 Ir-99.98 $Al_2O_3$ | 0 | 77 |
|  | 0.8 | 98 |

The results given above in the Table clearly show the ruthenium-iridium catalyst of this invention is an extremely effective catalyst for promoting the reduction of nitrogen oxides in exhaust gases containing small amounts of free oxygen. Further, the above results show that the catalyst of the invention is more effective than catalysts containing either the ruthenium component or the iridium component alone.

Since exhaust gas from an internal combustion engine normally contains free oxygen present in an amount in the order of 0.8–1.0 volume percent or less, this invention affords a a practical method of substantially reducing or eliminating the amount of nitrogen oxides contained in the exhaust gases from an internal combustion engine merely by contacting said exhaust gases with the ruthenium-iridium catalyst without the addition of supplemental air or oxygen in the exhaust stream.

EXAMPLE 3

The ruthenium-iridium catalyst prepared in example 1 was also evaluated for its effectiveness in promoting the oxidation of carbon monoxide and hydrocarbons.

In this test, the exhaust gas described in example 2 was enriched with oxygen to a concentration of 4 volume percent oxygen and thereafter contacted at 1,100° F. and 100,000 V/V/hr. with the catalyst in the manner of example 2. The amount of hydrocarbon and carbon monoxide conversion was found to be 99 percent and 57 respectively.

It is to be understood that the examples presented herein are intended to be merely illustrative of the invention and not limiting it in any manner; nor is the invention to be limited by any theory regarding its operability. The scope of the invention is to be determined by the appended claims.

What is claimed is:

1. A method of purifying exhaust gases from internal combustion engines, which comprises contacting said exhaust gases at temperatures in excess of 500° F. with a catalyst comprised of ruthenium and iridium.

2. A method according to claim 1 wherein the contacting of said exhaust gases is conducted at a temperature within the range between about 700° and 1,600° F.

3. A method of purifying exhaust gases from internal combustion engines by catalytically converting unburned hydrocarbons, carbon monoxide and nitrogen oxides present therein, which comprises contacting said exhaust gases at temperatures in excess of 500° F. with a catalyst comprising ruthenium and iridium, and having a ruthenium/iridium weight ratio in the range of about 0.1 to about 10, without adding external oxygen to the exhaust stream.

4. A method according to claim 3 wherein said catalyst has a ruthenium/iridium weight ratio in the range of about 1 to about 4.

5. A method according to claim 4 wherein the contacting of said exhaust gases is conducted at a temperature within the range between about 700° and 1,600° F.

6. A method of purifying exhaust gases from internal combustion engines by catalytically converting unburned hydrocarbons, carbon monoxide and nitrogen oxides present therein, which comprises contacting said exhaust gases at a temperature in excess of about 500° F. with the catalyst of claim 1 in the presence of less than about 2.0 volume percent oxygen based on total gas volume.

7. A method according to claim 6 wherein the contacting of said exhaust gases is conducted at a temperature in excess of about 700° F.

8. A method of purifying exhaust gases from internal combustion engines by catalytically converting unburned hydrocarbons, carbon monoxide and nitrogen oxide present therein, which comprises:

a. contacting said exhaust gases at temperatures in excess of about 500° F. with a catalyst comprising ruthenium and iridium, and having a ruthenium/iridium weight ratio in the range of about 0.1 to about 10, without adding external oxygen to the exhaust stream, and b. passing the resulting exhaust gases having a reduced nitrogen oxide content into contact with a catalyst comprising ruthenium and iridium, and having a ruthenium/iridium weight ratio in the range of in the range of about 0.1 to about 10, at a temperature in excess of 500° F. in the presence of oxygen or air which is added to the exhaust gas stream in an amount sufficient to catalytically oxidize the carbon monoxide and unburned hydrocarbon contained therein.

9. A method according to claim 8 wherein step (*a*) is carried out at a temperature within the range between about 700° and 1,300° F. and step (*b*) is carried out at a temperature within the range between about 700° and 1,600° F. and wherein said catalyst has a ruthenium/iridium weight ratio in the range of about 1 to about 4.

* * * * *

PO-1050
(5/69)

UNITED STATES PATENT OFFICE
CERTIFICATE OF CORRECTION

Patent No. 3,637,344 ~~Dated~~ Granted January 25, 1972

Inventor(s) Charles E. Thompson

It is certified that error appears in the above-identified patent and that said Letters Patent are hereby corrected as shown below:

Patent heading, change the issue date from "January 25, 1971" to --January 25, 1972--.

Signed and sealed this 22nd day of August 1972.

(SEAL)
Attest:

EDWARD M. FLETCHER, JR.
Attesting Officer

ROBERT GOTTSCHALK
Commissioner of Patents